Jan. 30, 1934. J. M. PESTARINI 1,945,447

CONTROL OF ELECTRIC MOTORS

Filed Dec. 23, 1932 2 Sheets-Sheet 1

INVENTOR
Joseph M. Pestarini
By
ATTORNEY

Patented Jan. 30, 1934

1,945,447

UNITED STATES PATENT OFFICE 1,945,447

CONTROL OF ELECTRIC MOTORS

Joseph Maxime Pestarini, Paris, France

Application December 23, 1932, Serial No. 648,708, and in France January 14, 1932

11 Claims. (Cl. 172—239)

This invention relates to the control of electric motors, and in particular to the control of motors which are connected in series with one another in an electric circuit supplied with direct electric current the strength of which is maintained constant notwithstanding variations in the voltage required by the apparatus included in the circuit. Such a series system of distribution is particularly suitable in connection with motors for cranes and other industrial applications in which the load is necessarily of a variable nature.

It is of importance that the apparatus for controlling motors should be as simple, strong and reliable as possible, since it is frequently exposed to rough handling and continual shocks. It is a common practice to employ for the control apparatus contactors and relays supplied from an auxiliary circuit at constant voltage, or the control apparatus may be included in the main current supply circuit of the motors. In the former case the apparatus is delicate and is liable easily to get out of order, as is frequently found in actual service, and in the second case the control apparatus must be heavy since it must withstand a current of the same strength as that supplied to the motors, which may be of the order of 600 amperes for example. Furthermore such control apparatus included in series involves a continuous expenditure of electrical energy. However if the controlling apparatus is included in the main circuit it will continue to receive current so long as the current is being supplied to the motors, whereas apparatus which is operated from a constant voltage circuit may fail owing to a fault in the primary voltage of the constant voltage circuit whilst the main current which supplies the motors continues to flow.

In a series system of distribution at constant current the voltage of the supply must necessarily vary, but it is, of course, desirable that the voltage should not exceed a certain limit in order to ensure the safety of the constant current circuit and the safety of the supply itself.

It is expedient, therefore, that the value of the current supplied to the main series circuit should be reduced automatically when the voltage of the circuit rises above a determined value. Furthermore it is frequently beneficial for the excitation current of the motors to decrease simultaneously with the current in the main series distribution circuit, or that it should decrease under such circumstances even more rapidly.

According to the present invention for the purpose of controlling a plurality of electric motors connected in a series distribution system supplied with electric energy from a main source of supply delivering a substantially constant current the control apparatus and field coils of the various motors are all connected in series in an auxiliary circuit which is supplied with constant current from a source interconnected with the main source of supply so that the current supplied by the two sources will decrease simultaneously when the voltage of the main series distribution system reaches a determined maximum value.

In order that the invention may be clearly understood it will now be described with reference to the accompanying drawings in which:—

Figures 1, 2:
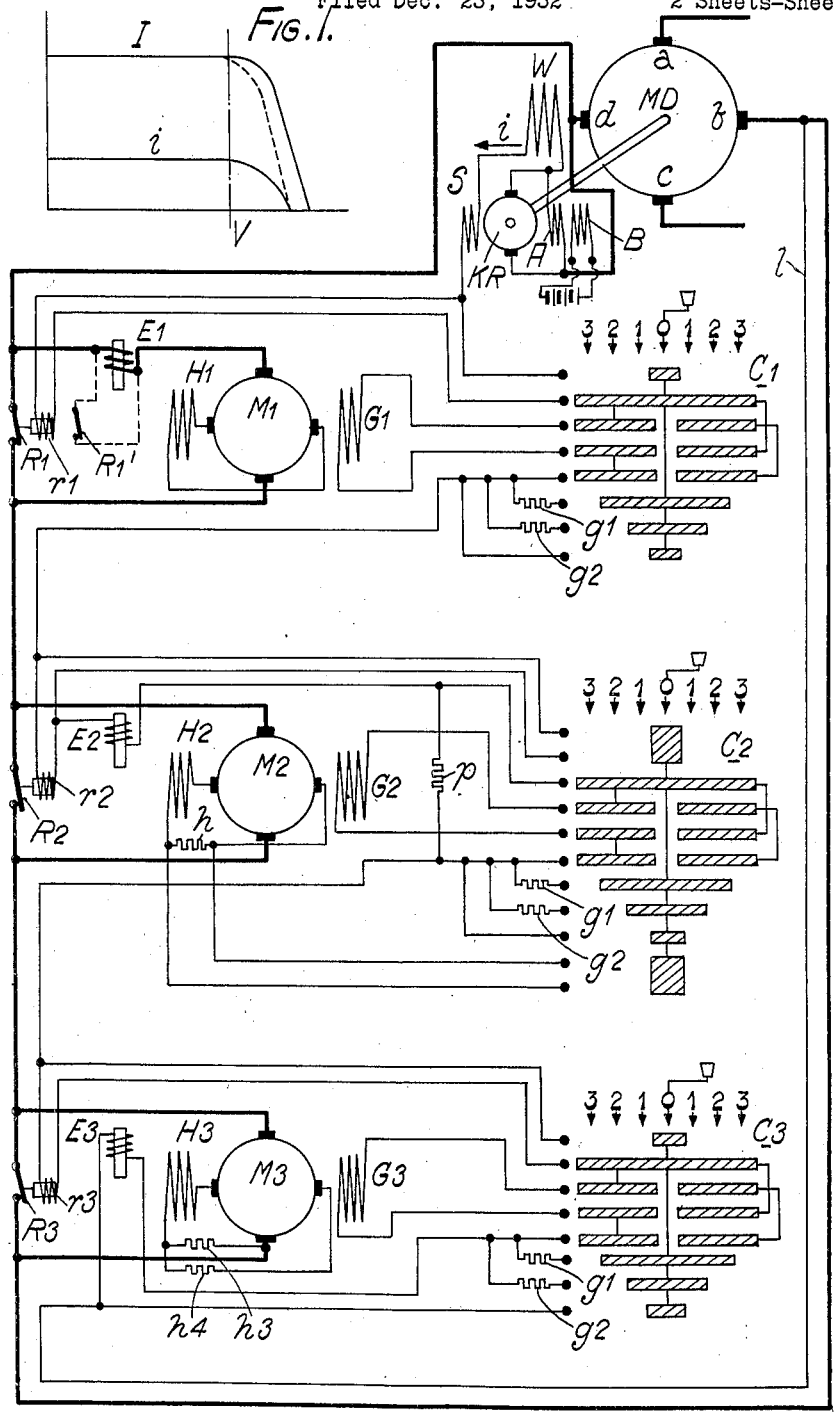
Fig. 1 is a diagram showing by means of curves the relationship between the currents and voltage in one arrangement of main and auxiliary circuits according to the invention.
Fig. 2 is a diagram showing by way of example an installation which includes three electric motors.

Referring to Fig. 1 the ordinates represent current in the main and auxiliary circuits, while the abscissæ represent the voltage in the main circuit. The upper curve marked I shows how the current in the main circuit varies with the voltage, whereas the lower curve marked $i$ indicates the current in the auxiliary circuit. It will be seen that at a determined voltage V both curves begin to droop, but the lower curve reaches the zero line of ordinates before the upper curve. The broken line indicates the value for $i$ multiplied by the value of the ratio $$\frac{I}{i}$$

corresponding to zero voltage. This shows that the current in the auxiliary circuit falls to zero relatively more rapidly than that in the main circuit.

The figure only indicates the general form of the currents in the main auxiliary circuits, and this may be considerably modified in certain cases, for example it may be necessary to arrange that the current in the auxiliary circuit shall be proportional to the current in the main circuit, or permitted to fall to zero later than the main circuit current.

Referring now to Fig. 2 the main distribution circuit is indicated in thick lines and the auxiliary or control circuit in thin lines. The main circuit is supplied with energy from a machine known as a metadyne. A metadyne is a rotary apparatus which is designed to transform a current supplied to it at a fixed voltage and variable amperes into a current at constant amperes and variable voltage. The apparatus comprises in general a rotor indicated at MD in the drawings provided with windings and a commutator somewhat similar to the armature of a direct current dynamo electric machine. Four sets of brushes are arranged to make contact with the commutator, two of which, marked $a$, $c$, are used for the primary circuit, and two, marked $b$, $d$, for the secondary circuit. The rotor is rotated at a constant speed in the magnetic field which is due to the currents circulating in the rotor windings, a stator (not shown in the figure) being provided which affords a return path of low magnetic resistance for the flux which is set up by the rotor currents. The stator is furnished with windings by which various magnetic fluxes can be obtained which combine with the magnetic fluxes due to the primary and secondary currents circulating in the rotor and thereby regulate the electro-mechanical performance of the machine.

In the main circuit supplied from the metadyne MD three motor metadynes are shown, the rotors of which are indicated at M1, M2, M3 respectively. Motor metadynes are machines of a similar nature to that above described, but transform electrical energy into mechanical energy when supplied with a constant current. Associated with each motor metadyne is a relay indicated at R1, R2, R3 respectively, each relay being arranged to open a short circuit across its associated metadyne when its coil $r1$, $r2$, $r3$ respectively is excited. The metadynes are provided with exciting windings G1, G2, G3 respectively included in the auxiliary control circuit and with a second exciting winding H1, H2, H3 respectively supplied from two brushes from its associated metadyne which are located at equal distances from the main supply brushes of the metadyne. The exciting windings H1, H2, H3 are arranged to oppose magnetically the other exciting windings G1, G2, G3 so that said windings H1, H2, H3 will by themselves always set up a braking torque on their respective metadynes. The exciting windings G1, G2, G3 may be provided with shunting resistances $g1$, $g2$ which in certain positions of the metadyne controllers will be connected in parallel with their respective exciting windings as hereinafter described. Each motor metadyne is provided with an electromagnetically operated brake which is released when the associated coils E1, E2, E3 respectively are energized. The controllers for the metadynes are marked C1, C2, C3 respectively and regulate the supply of current to the relay coils $r1$, $r2$, $r3$ and the cutting in and out of the shunting resistances $g1$, $g2$. The controllers are provided with three steps marked 1, 2, 3 on either side of the zero or off position so as to provide for forward or backward running of the metadynes at will. Where the brake magnet coils are included in the auxiliary circuit, as is shown in the case of the coils E2, E3 associated with the motor metadynes M2, M3, the controllers are arranged to control the supply of current for these as well.

The auxiliary circuit is supplied with a constant current from a dynamo KR of the "Kraemer" or well known "three-winding" type, which has the characteristic of supplying a constant current up to a determined voltage and on a further rise in voltage a current which drops rapidly to zero. The field magnet is excited by three windings: a shunt winding A, the resistance of which is adjusted in such a manner as to ensure proper excitation having regard to the speed, assumed to be constant, at which the dynamo is rotating, a series winding S and an independent exciting winding B which is supplied, for example, at constant voltage. In place of these three windings the Kraemer dynamo may have other equivalent windings of known type. The dynamo KR is rotated at constant speed and its rotor may be mounted as shown on the same shaft as the metadyne MD.

The auxiliary control circuit, as will be seen from the drawings, includes the exciting winding W of the main metadyne MD. This winding, commonly known as the variator winding, is arranged on the stator of the metadyne so that its magnetic axis is in line with the secondary brushes $b$, $d$ of the metadyne. The auxiliary distribution circuit also includes the total electromotive force supplied by the main metadyne MD to the main series distribution circuit, the return lead of the auxiliary circuit indicated at $l$ being connected to the brush $b$ of the main motor metadyne. By this arrangement the constant currents circulating in the main and auxiliary circuits will have the relationship shown by the diagram of Fig. 1, it being only necessary to adjust the ampere turns of the field windings S and W of the machines KR and MD respectively in order to cause the simultaneous decrease of the currents in the two circuits, or to make one decrease more rapidly than the other.

In operation, with the controllers in the off position the terminals of the various circuits including the coils $r1$, G1, etc. make contact along the line opposite O in the diagram, and the control circuit will be short-circuited. The relays R1, R2, R3 will therefore be closed so that the main current from the metadyne MD will not pass through any of the motors. If now, for example, the controller C1 is operated to one of the positions marked 1, the current in the control circuit will pass through the relay coil $r1$ and then through the exciting winding G1 and thence to the control circuit for the motor M2. The exciting winding G1 will be shunted by both the resistances $g1$, $g2$. The coil $r1$ being excited, the relay R1 will be opened and the main current will pass through the motor M1. At the same time current will also pass through the brake magnet coil E1, which will release the brake and the motor thereupon commences to rotate. On moving the controller C1 to one of the positions 2, shunting resistance $g2$ will be cut out so that the motor M1 will rotate at a faster speed, and on moving the controller to the final position 3 both the resistances $g1$ and $g2$ will be cut out so that the motor M1 will rotate at full speed. Movement of the controller to the positions on the other side of the off position will reverse the direction of current in the exciting winding G1, as will readily be understood from an inspection of the drawings. When it is desired to stop the motor the controller is moved to the zero or off position. The relay coil $r1$ will be short-circuited without being previously disconnected. Thus the relay R1 will not close the circuit to short-circuit the motor M1 until a short period of time $t$ for example has elapsed. On the other hand, the exciting winding G1 will be disconnected immediately the controller reaches the off position and the motor during the time $t$ will be excited only by the winding H1, it consequently exerts a powerful braking effect whilst regenerating nearly all its kinetic energy. At the end of the time $t$ the brake magnet coil E1 will be deenergized and the brake will be applied. By this arrangement the violence of the braking effect will be reduced, thus entailing less wear on the brakes. In some cases the brake magnet coil may be short-circuited by a pair of contacts R1' which are arranged to be closed at the same time that the relay contacts R1 are closed, and the brakes will then be applied as soon as the controller is moved to its off position. Such a short-circuit is shown in broken lines in the part of the figure associated with the motor M1.

In those parts of the figure associated with the motors M2 and M3 the brake magnet coils E2, E3 respectively are shown included in the control or auxiliary circuit and are arranged to be short-circuited by the respective controllers C2, C3 when these are in the off position. In these cases the action of the brake will be delayed owing to the short-circuiting of the coil E2 without previously interrupting the circuit thereof.

In the part of the figure associated with the motor M2 a resistance $h$ is shown in series with the exciting winding H2. This resistance is short-circuited when the controller C2 is moved to its zero or off position in order to increase the braking effect of the winding H2. Two resistances $h3$, $h4$ are shown associated with the motor M3 through one of which, $h3$, the exciting winding H3 is fed from one of the motor brushes connected to the main distribution circuit, the other being in circuit with the brush supplying the winding H3 which is not connected to the main distribution circuit. This arrangement enables the electro-mechanical characteristics of the motor M3 to be modified in a well known manner.

Referring again to that part of the diagram associated with the motor M2, a resistance $p$ is shown which permanently connects the two conductors of the control or auxiliary circuit in order to avoid accidental interruption of the auxiliary circuit which might be caused by a bad contact in the controller C2. Such a resistance may, of course, be provided in each circuit associated with a motor metadyne.

Figure 3:
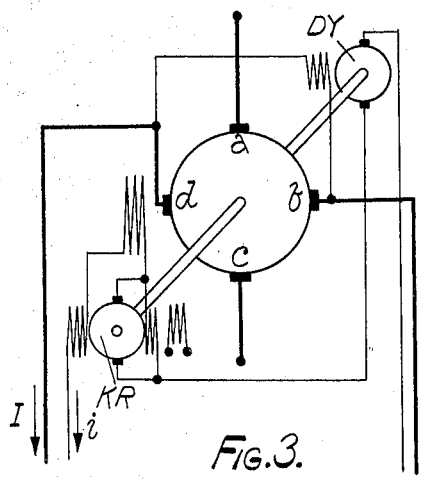
Figs. 3 to 6 are diagrams showing modified arrangements of supply devices for the main and auxiliary circuits.

If the secondary voltage, that is the voltage of the main distribution circuit at the brushes $b$, $d$ of the main metadyne MD is very high a high potential may be applied to all the apparatus in the auxiliary or control circuit. In order to avoid this the arrangement shown in Fig. 3 may be employed, which shows a small dynamo DY included in the auxiliary circuit in place of connecting this circuit in series with the brushes $b$, $d$. The dynamo may be direct-coupled with the metadyne MD and may be excited by a winding supplied from the brushes $b$, $d$ as shown. The voltage supplied to the control circuit, although it remains proportional to the secondary voltage of the metadyne may obviously have its actual value as low as desired.

Figure 4:
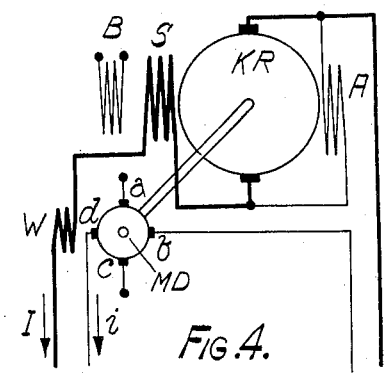

In Fig. 4 an arrangement is shown for supplying the main and auxiliary circuits in which the positions of the metadyne and Kraemer dynamo are interchanged the Kraemer dynamo is in this figure adapted to supply the power to the main distribution circuit and is mechanically driven by means not shown, whereas the metadyne MD has its secondary brushes $b$, $d$ included in the control circuit, the arrangements being in other respects the same as those of Fig. 2.

Figure 5:
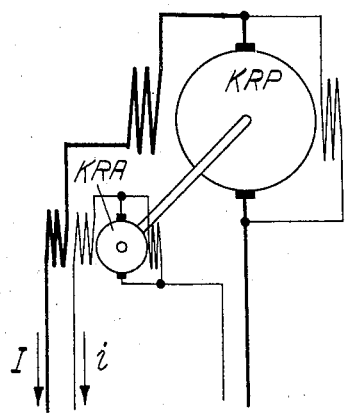

In Fig. 5 both the main and auxiliary circuits are supplied from machines of the Kraemer dynamo type, one of these being indicated at KRP for the main circuit and the other at KRA for the auxiliary circuit. The two machines have their rotors driven at a constant speed by means not shown in the drawings.

Figure 6:
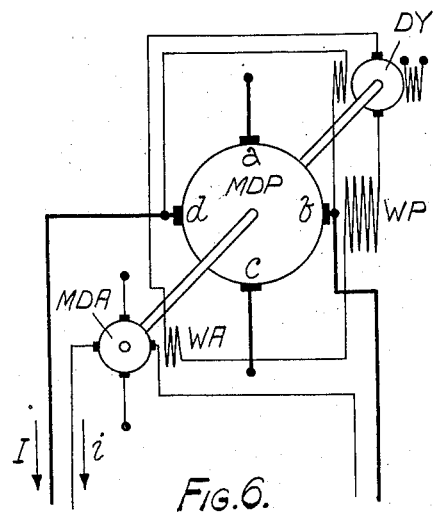

In Fig. 6 an arrangement is shown in which both machines are metadynes, that for the main circuit being indicated at MDP and that for the auxiliary circuit at MDA. These metadynes are both supplied with primary current from a source of constant voltage (not shown) and have their variator windings, which are magnetically co-axial with their respective secondary brushes and are marked WP and WA respectively connected in series and supplied from the same source, namely the dynamo DY driven from the metadyne shaft, which is provided with exciter windings and has its feed magnet operated at such a point on its saturation curve as will cause the voltage at its terminals to vary in accordance with the voltage at the secondary brushes $b$, $d$ of the main metadyne MDP. This arrangement is well known and no claim is made to it per se in the present application.

It will be observed that the arrangement herein described permits of the elimination of all delicate apparatus for controlling motors without entailing continuous expenditure of energy other than what is actually required for the excitation of the motors and the excitation of the brake electromagnets and a single relay for each motor. Furthermore, by the arrangements described a simultaneous decrease of the current in the armatures and field coils of the motors can be obtained by reason of the relationship of the currents in the main and control circuits in accordance with a law, which may be fixed to a large extent as desired.

Several examples have been described herein for the control of the motors and the interconnection of two sources, one of which supplies the main distribution circuit and the other of which supplies the control or auxiliary circuit, but it will be clear that modifications and alternations may be introduced without departing from the essential arrangements of the invention.

I claim:—

1. A system of distribution of electrical energy to direct current electric motors in which the armatures of the motors are connected in a series circuit supplied with constant direct current from a main source of supply, and the various windings and coils of the control apparatus for the various motors are included with the field windings in a separate auxiliary series circuit supplied with current from an auxiliary source of supply, and an additional field winding is provided on each motor arranged to oppose magnetically the usual field winding and connected to auxiliary collecting brushes disposed on the commutators of the respective motors and displaced from the brushes by which the main direct current is supplied to the motors.

2. A system as claimed in claim 1 in which at least one of the motors is provided with an electromagnetically controlled or operated brake, the controlling coil of which is included in series with the field magnet winding in the auxiliary circuit and so arranged that on stoppage of current in said circuit the brake will be applied.

3. A system as claimed in claim 1 wherein dynamo machines form the sources of supply for the main and auxiliary circuits and some of the field windings of such dynamo machines are connected in series with their respective numbers of turns so adjusted that the currents supplied by the two sources will decrease substantially simultaneously.

4. A system as claimed in claim 1 in which the sources of current supply are a metadyne and a dynamo of the Kraemer type.

5. A system as claimed in claim 1 in which the two sources of current supply are two dynamos of the Kraemer type.

6. A system as claimed in claim 1 in which the two sources of supply are two metadynes.

7. A system as claimed in claim 1 in which the current for the auxiliary circuit is supplied from an auxiliary source in series with the source of current supply for the main circuit.

8. A system as claimed in claim 1 in which the current for the auxiliary circuit is supplied from an auxiliary source of constant current in series with a dynamo mechanically driven by a constant current dynamo which supplies the main circuit.

9. A system as claimed in claim 1 in which the current for the main circuit is supplied from a metadyne which transforms a current supplied at a constant voltage into a constant current with variable voltage and the current for the auxiliary circuit is supplied from a second metadyne which transforms a current supplied at constant voltage into a constant current with variable voltage said second metadyne being excited by a field winding energized from a dynamo mechanically connected with the first named metadyne.

10. A system as claimed in claim 1 in which the auxiliary source of supply supplies a constant direct current to the auxiliary series circuit.

11. A system as claimed in claim 1 wherein dynamo machines form the sources of supply for the main and auxiliary circuits and some of the field windings of such dynamo machines are connected in series with their respective numbers of turns so adjusted as to produce a desired relationship of the currents in the main and auxiliary circuits.

JOSEPH MAXIME PESTARINI.